(12) United States Patent
Sugiya et al.

(10) Patent No.: US 12,305,722 B2
(45) Date of Patent: May 20, 2025

(54) CAM CLUTCH

(71) Applicant: TSUBAKIMOTO CHAIN CO., Osaka (JP)

(72) Inventors: Tsubasa Sugiya, Osaka (JP); Eiichi Nakagawa, Osaka (JP); Yuji Kurematsu, Osaka (JP); Akihiro Fukuda, Osaka (JP); Hiroyuki Kamihigashi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/773,812

(22) Filed: Jul. 16, 2024

(65) Prior Publication Data

US 2025/0035169 A1 Jan. 30, 2025

(30) Foreign Application Priority Data

Jul. 25, 2023 (JP) .................................. 2023-121043

(51) Int. Cl.
*F16D 41/07* (2006.01)
*F16D 41/08* (2006.01)

(52) U.S. Cl.
CPC ........... *F16D 41/07* (2013.01); *F16D 41/084* (2013.01)

(58) Field of Classification Search
CPC ........ F16D 41/06; F16D 41/069; F16D 41/07; F16D 41/076; F16D 41/08; F16D 41/084; F16D 41/10; F16D 2041/0605; F16D 2041/0603
See application file for complete search history.

(56) References Cited

U.S. PATENT DOCUMENTS

| | | | | | |
|---|---|---|---|---|---|
| 4,360,093 | A | * | 11/1982 | Wakabayashi | F16D 41/07 192/41 A |
| 4,766,987 | A | * | 8/1988 | Message | F16D 41/07 192/41 A |
| 4,848,507 | A | * | 7/1989 | Masuda | F16D 41/04 192/48.92 |
| 5,842,548 | A | * | 12/1998 | Sato | F16D 41/07 192/42 |
| 2007/0074945 | A1 | * | 4/2007 | Ponson | F16D 43/211 192/41 A |

FOREIGN PATENT DOCUMENTS

| | | |
|---|---|---|
| JP | 2005-505431 A | 2/2005 |
| JP | 2021-156432 A | 10/2021 |
| WO | 03/033203 A1 | 4/2003 |

* cited by examiner

*Primary Examiner* — Timothy Hannon
(74) *Attorney, Agent, or Firm* — WHDA, LLP

(57) ABSTRACT

Providing a cam clutch that has a torque limiter function adaptable to high torque with a simple structure, excellent accuracy, stability, and durability, and can be downsized and have an increased service life. The cam clutch includes: a plurality of cams disposed in a circumferential direction between at least one pair of an inner ring and an outer ring that are coaxial with each other and rotatable relative to each other; and biasing means for biasing the plurality of cams so as to come into contact with the inner ring and the outer ring. Each of the cams includes an inclination restricting portion that restricts inclination of the cam in an engaging direction by coming into contact with a locking portion that is provided in a portion of the cam clutch other than cam receiving surfaces of the inner ring and the outer ring.

6 Claims, 12 Drawing Sheets

CAM CLUTCH

BACKGROUND OF THE INVENTION

1. Field of the Invention

The present invention relates to a cam clutch having a torque limiter function.

2. Description of the Related Art

As clutches that transmit torque from an input shaft to an output shaft or shut off the transmission, clutches including a torque limiter for preventing transmission of excessive torque are known.

Known torque limiters include so-called friction type torque limiters using a tolerance ring or a friction plate and so-called mechanical torque limiters using a ball and biasing means for applying a load to the ball in an axial direction or a radial direction, for example. A coil spring, a disk spring, a leaf spring, or the like is used as the biasing means.

For example, Japanese Patent Application Publication No. 2021-156432 discloses a torque limiter including a tolerance ring disposed between an outer circumferential surface of an outer ring and an inner circumferential surface of an input transmission member or between an outer circumferential surface of an inner ring and an outer circumferential surface of an input transmission member. The torque limiter is configured such that, when torque larger than prescribed torque is input, slipping occurs between the tolerance ring and the inner ring, the outer ring, or the input transmission member to restrict transmission of the torque.

Also, Japanese Translation of PCT Application No. 2005-505431 discloses a torque limiter including a circular leaf spring provided to apply a force to a ball fitted in a hole toward one side. The torque limiter is configured such that, when excessive torque is input, for example, the leaf spring elastically deforms in an opening-enlarging direction, and the ball is pushed out from the hole to restrict transmission of the torque.

SUMMARY OF THE INVENTION

However, most of friction type torque limiters such as the torque limiter described in Japanese Patent Application Publication No. 2021-156432 largely depend on the friction coefficient of the friction plate or the like, and slide at the time of tripping (when transmission of the torque is shut off). Accordingly, a clutch including such a torque limiter has a difficulty in load control due to environmental changes, and when tripping is repeated, there is a concern about durability and instability of the limiter load due to wear.

Also, mechanical torque limiters such as the torque limiter described in Japanese Translation of PCT Application No. 2005-505431 have a difficulty in generating high torque with use of a leaf spring or the like as the biasing means, and a large space is necessary to dispose the biasing means. Accordingly, such mechanical torque limiters are unsuitable for transmission of motive power in a vehicle that requires high torque and space saving. Also, there is a problem in that the number of components increases and the production cost increases. Furthermore, positioning of the leaf spring is necessary.

On the other hand, it is conceivable to configure a torque limiter by using an upper limit of engagement torque determined by the cam shape of a cam clutch and causing a cam surface to slide when the torque exceeds the upper limit.

For example, as shown in FIG. 1, when rated torque is applied, a cam 530 engages and serves as a wedge between an inner ring cam receiving surface 511 and an outer ring cam receiving surface 521, and an inner-ring-side cam surface 531 of the cam 530 transmits torque, but the cam 530 inclines when excessive torque is input, and when the torque exceeds the upper limit of the engagement torque, the cam inclines past a wedge angle limit of an R shape of the cam, which transmits the torque.

In the case where the cam surface has a shape like that shown in the upper part of FIG. 1, when the cam inclines past the wedge angle limit, contact points between the cam and the cam receiving surfaces move instantaneously and a wedge angle effect is lost. Accordingly, the torque is released (rollover), and a large impact is generated.

Moreover, the cam that has once inclined past the angle limit in rollover when functioning as the torque limiter does not return to its original state. Therefore, the torque limiter operates only once and the whole cam clutch needs to be replaced (or disassembled and reassembled, for example).

Also, as shown in the lower part of FIG. 1, in a case where a surface configured to slide against a cam receiving surface is provided so as to extend from the wedge angle limit to prevent rollover after the cam inclines past the wedge angle limit, when friction exceeds a static friction limit at the wedge angle limit position, the cam and the cam surface slide and the torque is suddenly released.

At this time, a phenomenon (pop out) occurs in which the cam suddenly returns to the state where no load is applied thereto, and there is a problem in that damage may occur at this time due to collision between the cam and the cam receiving surface.

The present invention was made under the above circumstances, and has an object of providing a cam clutch that has a torque limiter function adaptable to high torque with a simple structure, excellent accuracy, stability, and durability, and can be downsized and have an increased service life.

The present invention solves the above problem with a cam clutch including: at least one pair of an inner ring and an outer ring that are coaxial with each other and rotatable relative to each other; a plurality of cams disposed in a circumferential direction between the inner ring and the outer ring; and biasing means for biasing the plurality of cams so as to come into contact with the inner ring and the outer ring, wherein each of the cams includes an inclination restricting portion that restricts inclination of the cam in an engaging direction by coming into contact with a locking portion that is provided in a portion of the cam clutch other than cam receiving surfaces of the inner ring and the outer ring.

According to one aspect of the present application, each cam includes the inclination restricting portion that restricts inclination in the engaging direction by coming into contact with the locking portion provided in a portion other than the cam receiving surfaces of the inner ring and the outer ring. With this configuration, engagement of the cams is restricted to an inclined state corresponding to a suitable torque lower than an upper limit of engagement torque, which depends on the shape of the cams, and accordingly, it is possible to precisely set an upper limit of transmitted torque for the cam clutch serving as a torque limiter.

Moreover, this configuration increases freedom in the design, keeps the cams from inclining past the wedge angle limit of their R shape, which transmits torque, and prevents a situation in which the torque is released as a result of the wedge angle suddenly changing due to instantaneous movement of contact points to a surface where slipping occurs, and accordingly, even if the torque exceeds the torque limit, the torque is not suddenly released, and a reduction in durability due to pop out can be suppressed.

Furthermore, the locking portion is provided in a portion other than the cam receiving surfaces of the inner ring and the outer ring. Therefore, it is possible to suppress sliding due to wear of the cam receiving surfaces of the inner ring and the outer ring and to increase the durability.

According to another aspect of the present application, the locking portion is provided in a cage member that supports and lines up the plurality of cams in the circumferential direction. Accordingly, the locking portion can be provided at a position where it does not come into contact with the cam receiving surfaces of the inner ring and the outer ring in a portion extending from cam surfaces, and it is possible to provide the locking portion and the inclination restricting portion constituting the torque limiter without increasing the entire length of the cam clutch in an axial direction.

Also, if the cage member is configured to be movable in a radial direction relative to the inner ring and the outer ring, even if the plurality of cams incline in a non-uniform manner due to shifting of the axes of the inner ring and the outer ring, the upper limit torque of the plurality of cams can be kept uniform due to the cage member moving in the radial direction, and accordingly, it is possible to more precisely set the upper limit of the transmitted torque.

According to another aspect of the present application, the inclination restricting portion is provided in one end portion or two end portions of the cam in an axial direction. This configuration makes it possible to form the inclination restricting portion independently of the shape design of the cam surfaces, and increases freedom in the design, and also makes it possible to precisely set inclination and more precisely set the upper limit of the transmitted torque for the cam clutch serving as the torque limiter.

According to another aspect of the present application, the locking portion is provided in a restriction member that is fitted to the outer ring or the inner ring from a side in the axial direction. This configuration makes it possible to set the upper limit of the torque to different values by changing the restriction member while using the same inner ring, outer ring, and cams.

Also, even if the locking portion deteriorates through wear or the like, it is possible to stably maintain the upper limit of the torque for a long period of time by replacing the restriction member.

DESCRIPTION OF THE PREFERRED EMBODIMENTS

First Embodiment

Figure 1:
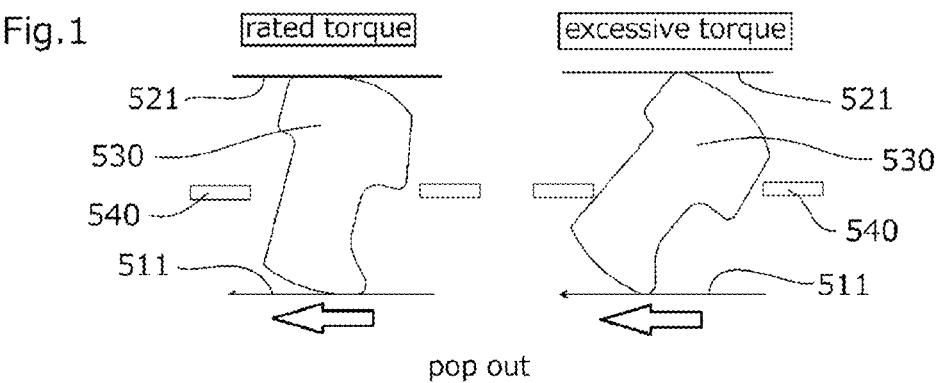
FIG. 1 is a diagram showing operations of conventional cam clutches when excessive torque is input.
Figure 2:
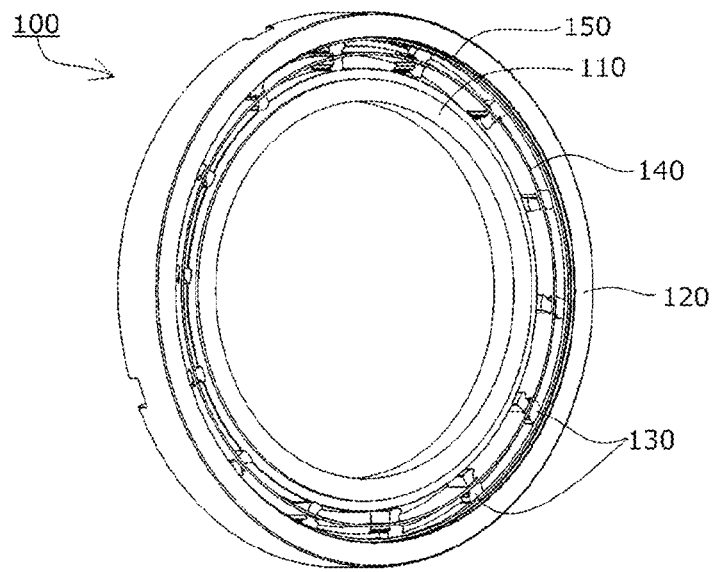
FIG. 2 is a perspective view of a cam clutch according to a first embodiment of the present invention.
Figure 3:
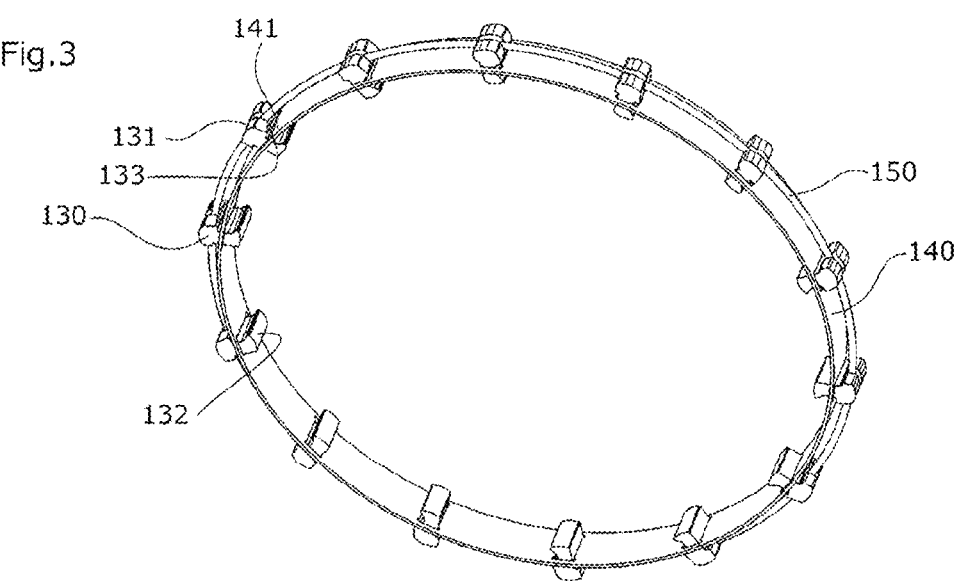
FIG. 3 is a perspective view of the cam clutch shown in FIG. 2 from which an outer ring and an inner ring are removed.
Figure 4:
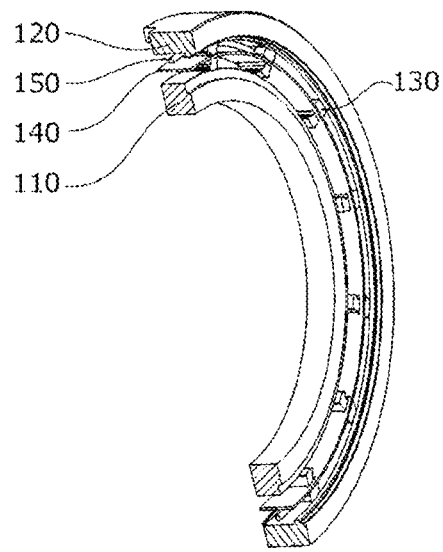
FIG. 4 is a partially cross-sectional perspective view of the cam clutch shown in FIG. 2.
Figure 5:
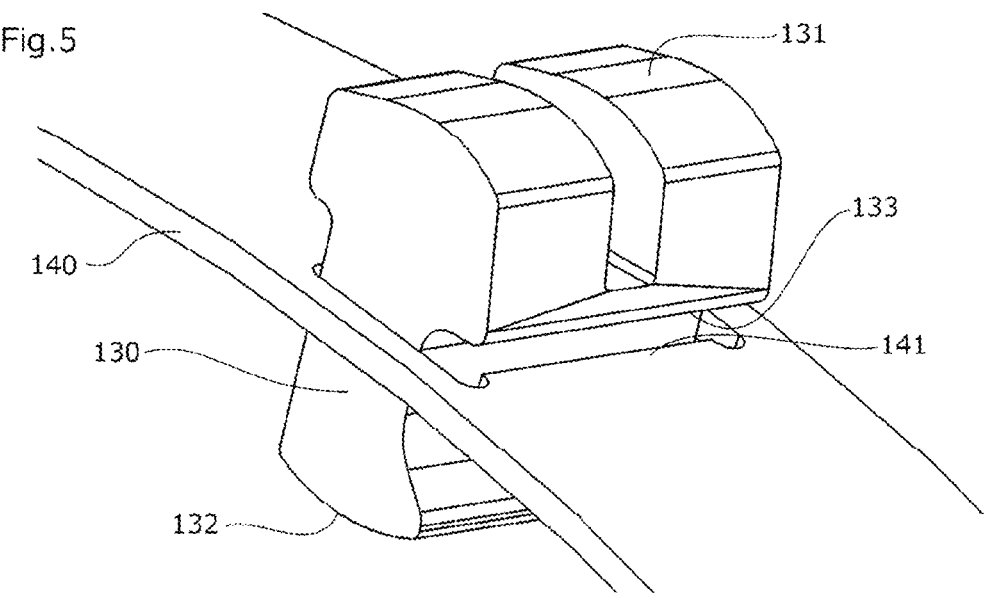
FIG. 5 is an enlarged perspective view of a cam and a cage shown in FIG. 2.

As shown in FIGS. 2 to 5, a cam clutch 100 according to a first embodiment of the present invention includes an inner ring 110 and an outer ring 120 that are coaxial with each other and rotatable relative to each other, a plurality of cams 130 disposed in a circumferential direction between the inner ring 110 and the outer ring 120 to transmit torque, and biasing means (garter spring) 150 for biasing the plurality of cams 130 so as to come into contact with the inner ring 110 and the outer ring 120.

The plurality of cams 130 are supported and lined up in the circumferential direction by a cage member 140.

Each cam 130 includes an inclination restricting portion 133 that restricts inclination in an engaging direction by coming into contact with a locking portion 141 of the cage member 140.

The following describes operations of a torque limiter function of the cam clutch 100 configured as described above.

Figure 6:
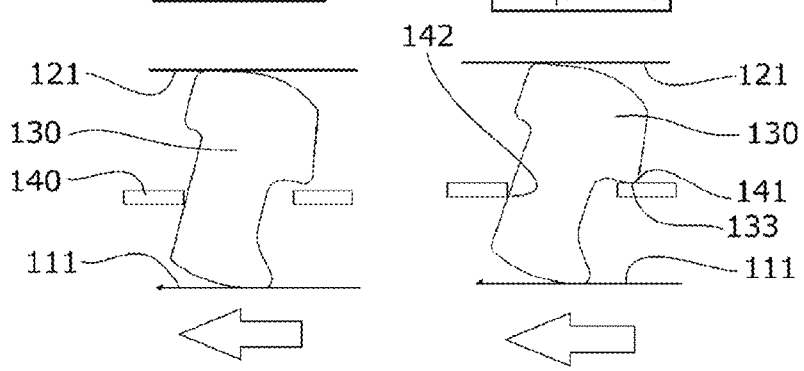
FIG. 6 is a diagram showing operations of the cam clutch according to the first embodiment when excessive torque is input.

As shown in FIG. 6, when rated torque is applied, each cam 130 engages and serves as a wedge between an inner ring cam receiving surface 111 and an outer ring cam receiving surface 121, and an inner-ring-side cam surface 131 of the cam 130 transmits torque.

When the transmitted torque reaches a predetermined torque, a rear surface of each cam 130, which is opposite to the inclination restricting portion 133 in the circumferential direction, comes into contact with a frame edge 142 of the cage member 140 and the inclination restricting portion 133 of the cam 130 comes into contact with the locking portion 141 of the cage member 140. Thus, further inclination of the cam 130 is prevented to suppress further engagement. Accordingly, when torque higher than the predetermined torque is applied, slipping occurs between the cam receiving surface 111 of the inner ring 110 and a cam surface 132 of the cam 130 or between the cam receiving surface 121 of the outer ring 120 and the cam surface 131 of the cam 130, and the torque is released.

Figure 7A:
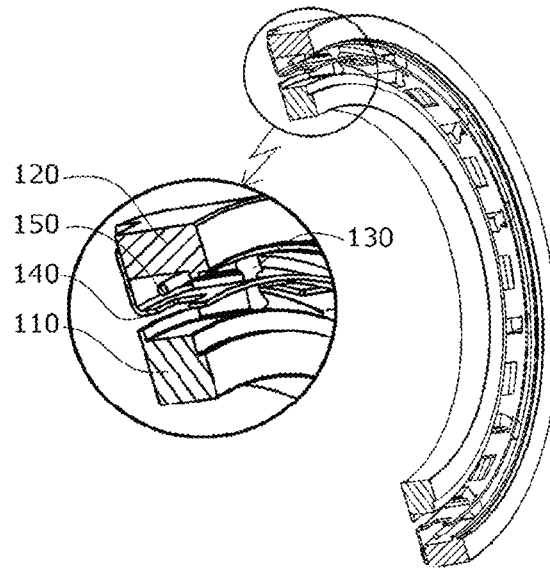
FIGS. 7A and 7B are partially cross-sectional perspective views of a first variation of the cam clutch according to the first embodiment.
Figure 7B:
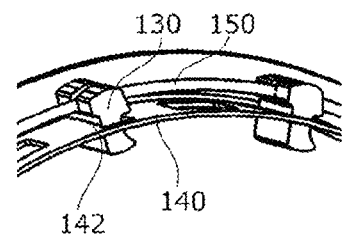

Also, in a case where the cage member 140 is fixed in the rotation direction relative to the outer ring 120 as in a variation shown in FIGS. 7A and 7B (7A: partially cross-sectional perspective view, 7B: diagram in which the inner ring and the outer ring are omitted), it is possible to prevent further inclination of the cam 130 with only the configuration in which the rear surface of the cam 130, which is opposite to the inclination restricting portion 133 in the circumferential direction, comes into contact with the frame edge 142 of the cage member 140. In this case, the rear surface serves as an inclination restricting portion, and the frame edge 142 of the cage member 140 serves as a locking portion.

Figure 8A:
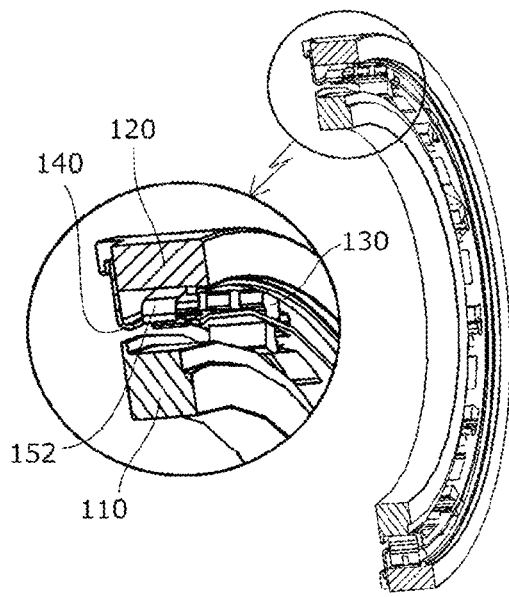
FIGS. 8A and 8B are partially cross-sectional perspective views of a second variation of the cam clutch according to the first embodiment.
Figure 8B:
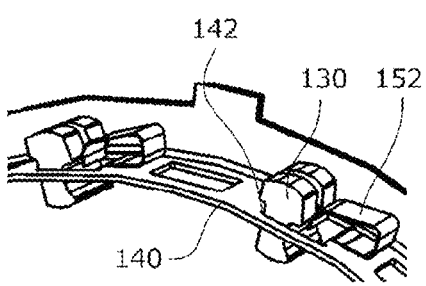

Furthermore, as in another variation shown in FIGS. 8A and 8B (8A: partially cross-sectional perspective view, 8B: diagram in which the inner ring and the outer ring are omitted), a pressing piece 152 that always biases a cam 130 toward the frame edge 142 may be provided in correspondence with each cam 130 on the cage member 140 fixed in the rotation direction relative to the outer ring 120, and the pressing piece 152 may be used as biasing means for biasing the cam 130 so as to come into contact with the inner ring 110 and the outer ring 120.

The pressing piece 152 may be separate from the cage member 140, or the cage member 140 may be formed from a spring material and the pressing piece 152 and the cage member 140 may be formed as a single piece.

Second Embodiment

Figure 9:
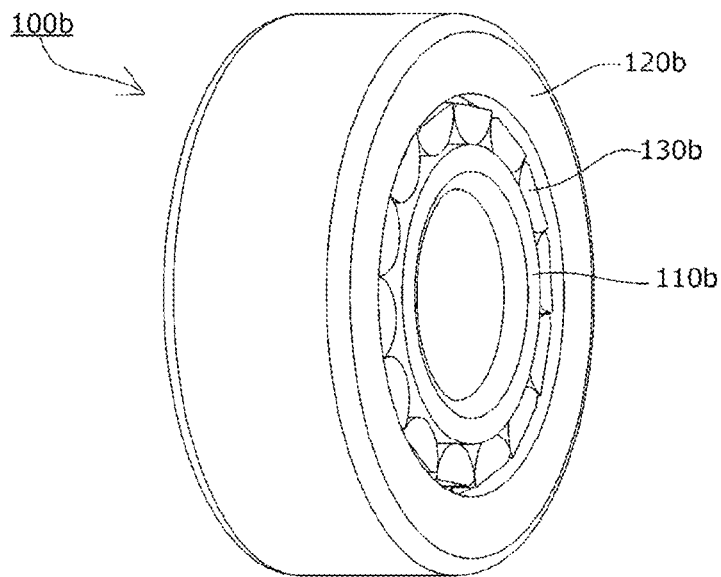
FIG. 9 is a perspective view of a cam clutch according to a second embodiment of the present invention.
Figure 10:
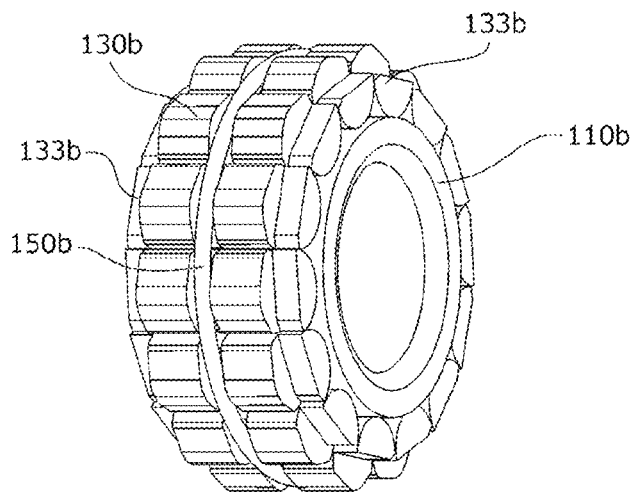
FIG. 10 is a perspective view of the cam clutch shown in FIG. 9 from which an outer ring is removed.
Figure 11:
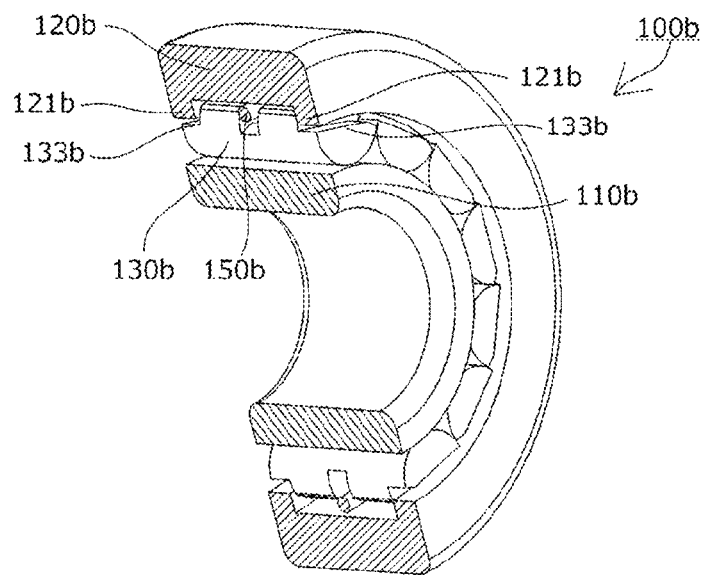
FIG. 11 is a partially cross-sectional perspective view of the cam clutch shown in FIG. 9.

As shown in FIGS. 9 to 11, a cam clutch 100b according to a second embodiment of the present invention includes an inner ring 110b and an outer ring 120b that are coaxial with each other and rotatable relative to each other, a plurality of cams 130b disposed in a circumferential direction between the inner ring 110b and the outer ring 120b to transmit torque, and biasing means (garter spring) 150b for biasing the plurality of cams 130b in a radial direction.

The plurality of cams 130b in the present embodiment each include a continuous circumferential surface other than cam surfaces, and can be lined up by themselves without the use of a cage member, but a cage member may also be provided.

Inclination restricting portions 133b are provided in two side portions of each cam 130b and restrict inclination in an engaging direction by coming into contact with locking portions 121b provided in the outer ring 120b.

In this cam clutch 100b, when the transmitted torque reaches a predetermined torque, the inclination restricting portions 133b of the cams 130b come into contact with the locking portions 121b of the outer ring 120b. Thus, further inclination of the cams 130b is prevented to suppress further engagement. Accordingly, when torque higher than the predetermined torque is applied, slipping occurs between a cam receiving surface of the inner ring 110b and cam surfaces of the cams 130b or between a cam receiving surface of the outer ring 120b and cam surfaces of the cams 130b, and the torque is released.

Third Embodiment

Figure 12:
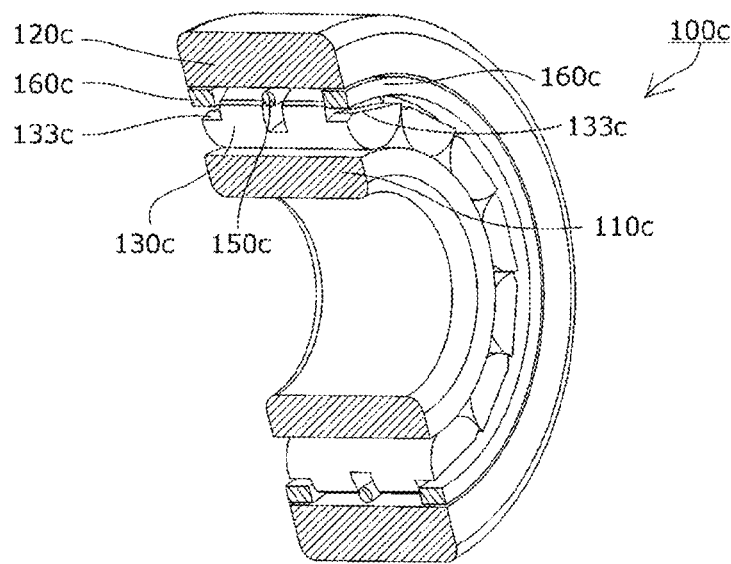
FIG. 12 is a partially cross-sectional perspective view of a cam clutch according to a third embodiment of the present invention.

As shown in FIG. 12, a cam clutch 100c according to a third embodiment of the present invention includes an inner ring 110c and an outer ring 120c that are coaxial with each other and rotatable relative to each other, a plurality of cams 130c disposed in a circumferential direction between the inner ring 110c and the outer ring 120c to transmit torque, and biasing means (garter spring) 150c for biasing the plurality of cams 130c in a radial direction.

The plurality of cams 130c each include a continuous circumferential surface other than cam surfaces, and can be lined up by themselves without the use of a cage member.

Inclination restricting portions 133c are provided in two side portions of each cam 130c and restrict inclination in an engaging direction by coming into contact with restriction members 160c that constitute locking portions.

The restriction members 160c are ring-shaped and inserted to the inner side of two side portions of the outer ring 120c.

In this cam clutch 100c, when the transmitted torque reaches a predetermined torque, the inclination restricting portions 133c of the cams 130c come into contact with the restriction members 160c. Thus, further inclination of the cams 130c is prevented to suppress further engagement. Accordingly, when torque higher than the predetermined torque is applied, slipping occurs between a cam receiving surface of the inner ring 110c and cam surfaces of the cams 130c or between a cam receiving surface of the outer ring 120c and cam surfaces of the cams 130c, and the torque is released.

Fourth Embodiment

Figure 13:
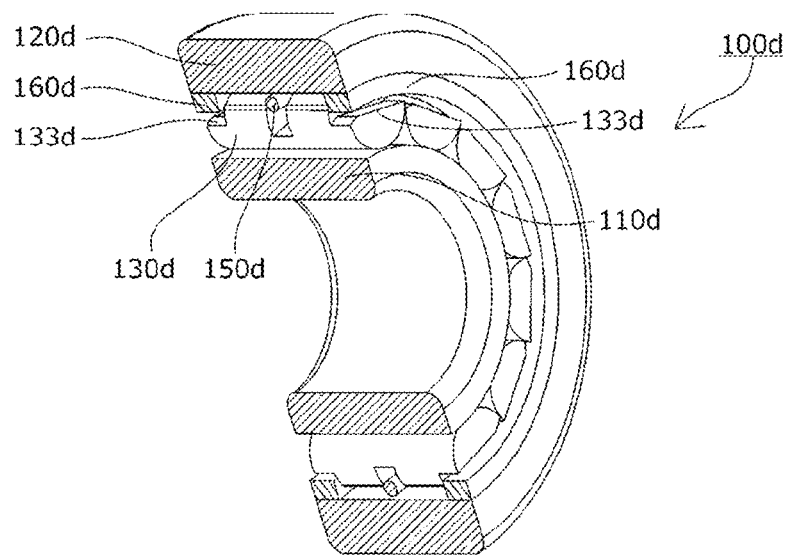
FIG. 13 is a partially cross-sectional perspective view of a cam clutch according to a fourth embodiment of the present invention.

As shown in FIG. 13, a cam clutch 100d according to a fourth embodiment of the present invention includes an inner ring 110d and an outer ring 120d that are coaxial with each other and rotatable relative to each other, a plurality of cams 130d disposed in a circumferential direction between the inner ring 110d and the outer ring 120d to transmit torque, and biasing means (garter spring) 150d for biasing the plurality of cams 130d in a radial direction.

The plurality of cams 130d in the present embodiment each include a continuous circumferential surface other than cam surfaces, and can be lined up by themselves without the use of a cage member, but a cage member may also be provided.

Inclination restricting portions 133d are provided in two side portions of each cam 130d and restrict inclination in an engaging direction by coming into contact with restriction members 160d that constitute locking portions.

The restriction members 160d are ring-shaped and press-fitted to the inner side of two side portions of the outer ring 120d.

In this cam clutch 100d, when the transmitted torque reaches a predetermined torque, the inclination restricting portions 133d of the cams 130d come into contact with the restriction members 160d. Thus, further inclination of the cams 130d is prevented to suppress further engagement.

Accordingly, when torque higher than the predetermined torque is applied, slipping occurs between a cam receiving surface of the inner ring 110*d* and cam surfaces of the cams 130*d* or between a cam receiving surface of the outer ring 120*d* and cam surfaces of the cams 130*d*, and the torque is released.

Fifth Embodiment

Figure 14:
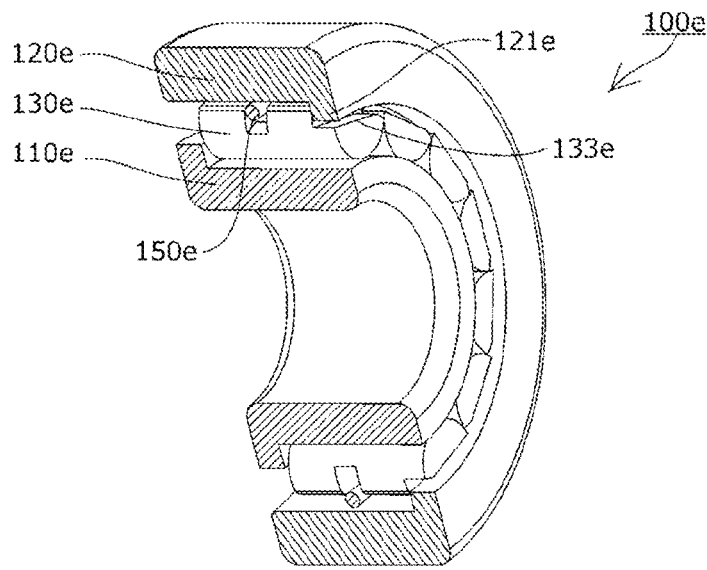
FIG. 14 is a partially cross-sectional perspective view of a cam clutch according to a fifth embodiment of the present invention.
Figure 15:
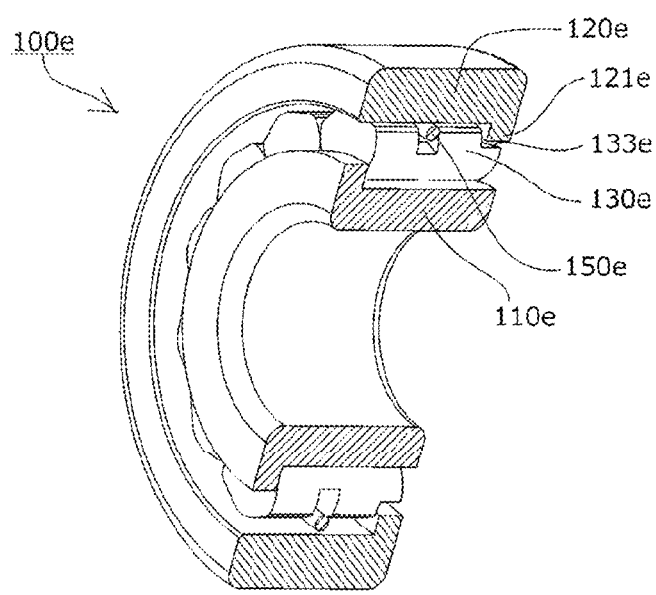
FIG. 15 is a partially cross-sectional perspective view of the cam clutch shown in FIG. 14 as viewed from a different viewpoint.

As shown in FIGS. 14 and 15, a cam clutch 100*e* according to a fifth embodiment of the present invention includes an inner ring 110*e* and an outer ring 120*e* that are coaxial with each other and rotatable relative to each other, a plurality of cams 130*e* disposed in a circumferential direction between the inner ring 110*e* and the outer ring 120*e* to transmit torque, and biasing means (garter spring) 150*e* for biasing the plurality of cams 130*e* in a radial direction.

The plurality of cams 130*e* in the present embodiment each include a continuous circumferential surface other than cam surfaces, and can be lined up by themselves without the use of a cage member, but a cage member may also be provided.

An inclination restricting portion 133*e* is provided in a side portion of each cam 130*e* and restricts inclination in an engaging direction by coming into contact with a locking portion 121*e* provided in the outer ring 120*e*.

In this cam clutch 100*e*, when the transmitted torque reaches a predetermined torque, the inclination restricting portions 133*e* of the cams 130*e* come into contact with the locking portion 121*e* of the outer ring 120*e*. Thus, further inclination of the cams 130*e* is prevented to suppress further engagement. Accordingly, when torque higher than the predetermined torque is applied, slipping occurs between a cam receiving surface of the inner ring 110*e* and cam surfaces of the cams 130*e* or between a cam receiving surface of the outer ring 120*e* and cam surfaces of the cams 130*e*, and the torque is released.

Sixth Embodiment

Figure 16:
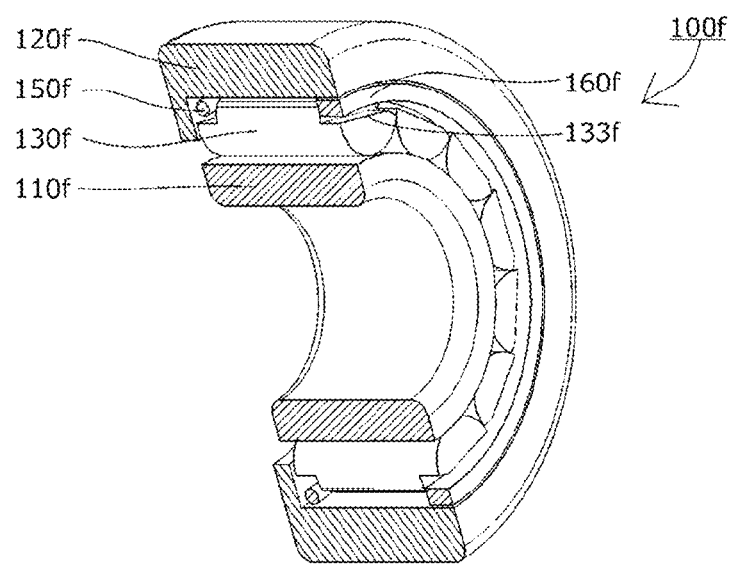
FIG. 16 is a partially cross-sectional perspective view of a cam clutch according to a sixth embodiment of the present invention.
Figure 17:
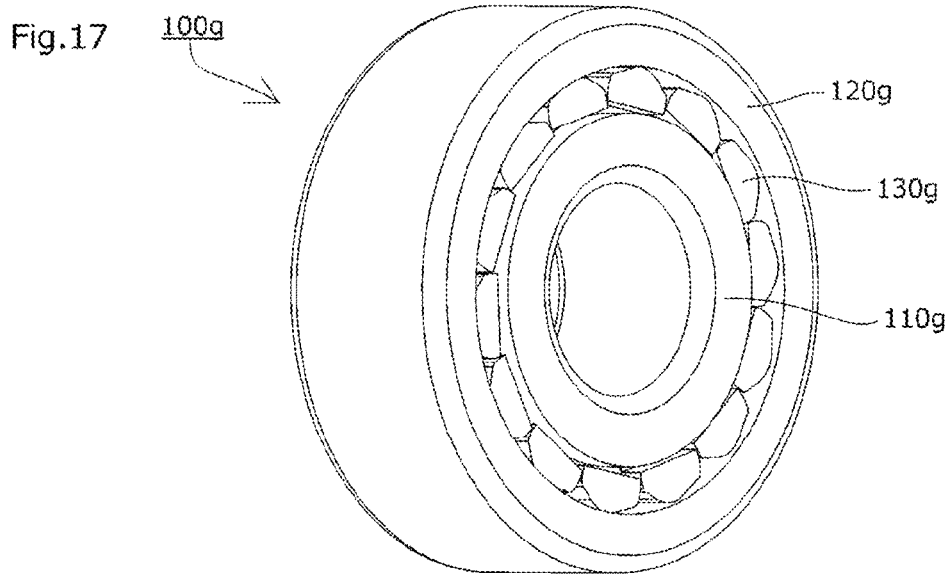
FIG. 17 is a perspective view of a cam clutch according to a seventh embodiment of the present invention.
Figure 18:
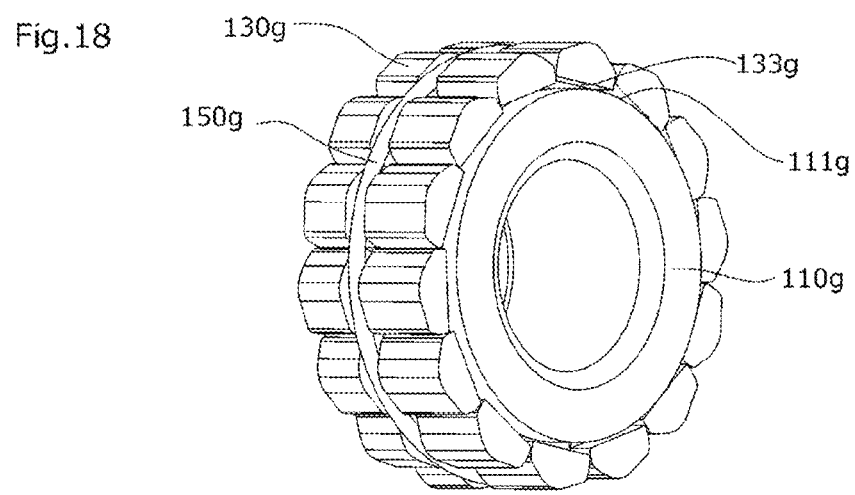
FIG. 18 is a perspective view of the cam clutch shown in FIG. 17 from which an outer ring is removed.
Figure 19:
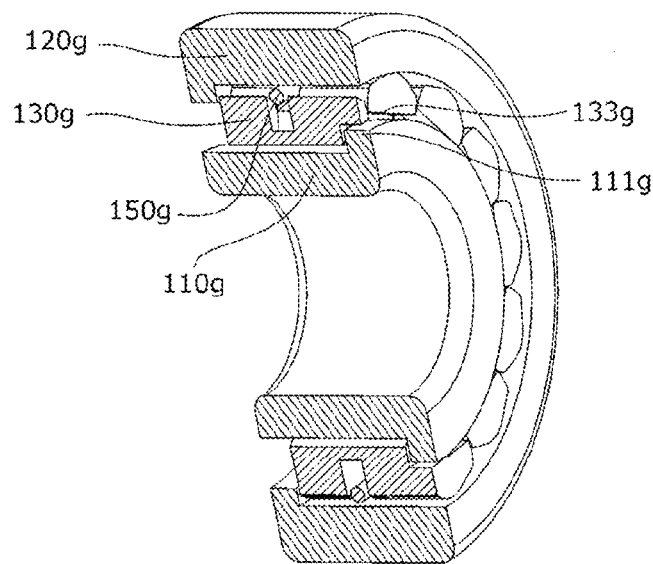
FIG. 19 is a partially cross-sectional perspective view of the cam clutch shown in FIG. 17.
Figure 20:
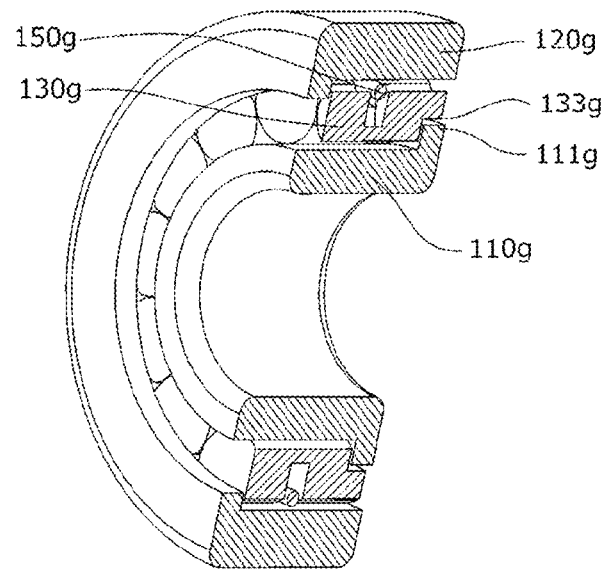
FIG. 20 is a partially cross-sectional perspective view of the cam clutch shown in FIG. 17 as viewed from a different viewpoint.

As shown in FIG. 16, a cam clutch 100*f* according to a sixth embodiment of the present invention includes an inner ring 110*f* and an outer ring 120*f* that are coaxial with each other and rotatable relative to each other, a plurality of cams 130*f* disposed in a circumferential direction between the inner ring 110*f* and the outer ring 120*f* to transmit torque, and biasing means (garter spring) 150*f* for biasing the plurality of cams 130*f* in a radial direction.

The plurality of cams 130*f* in the present embodiment each include a continuous circumferential surface other than cam surfaces, and can be lined up by themselves without the use of a cage member, but a cage member may also be provided.

An inclination restricting portion 133*f* is provided in a side portion of each cam 130*f* and restricts inclination in an engaging direction by coming into contact with a restriction member 160*f* that constitutes a locking portion.

The restriction member 160*f* is ring-shaped and inserted to the inner side of a side portion of the outer ring 120*f*. The other side portions of the cams 130*f* are biased by the biasing means (garter spring) 150*f*.

In this cam clutch 100*f*, when the transmitted torque reaches a predetermined torque, the inclination restricting portions 133*f* of the cams 130*f* come into contact with the restriction member 160*f* constituting the locking portion. Thus, further inclination of the cams 130*f* is prevented to suppress further engagement. Accordingly, when torque higher than the predetermined torque is applied, slipping occurs between a cam receiving surface of the inner ring 110*f* and cam surfaces of the cams 130*f* or between a cam receiving surface of the outer ring 120*f* and cam surfaces of the cams 130*f*, and the torque is released.

Seventh Embodiment

As shown in FIGS. 17 to 20, a cam clutch 100*g* according to a seventh embodiment of the present invention includes an inner ring 110*g* and an outer ring 120*g* that are coaxial with each other and rotatable relative to each other, a plurality of cams 130*g* disposed in a circumferential direction between the inner ring 110*g* and the outer ring 120*g* to transmit torque, and biasing means (garter spring) 150*g* for biasing the plurality of cams 130*g* in a radial direction.

The plurality of cams 130*g* in the present embodiment each include a continuous circumferential surface other than cam surfaces, and can be lined up by themselves without the use of a cage member, but a cage member may also be provided.

An inclination restricting portion 133*g* is provided in a side portion of each cam 130*g* and restricts inclination in an engaging direction by coming into contact with a locking portion 111*g* provided in the inner ring 110*g*.

In this cam clutch 100*g*, when the transmitted torque reaches a predetermined torque, the inclination restricting portions 133*g* of the cams 130*g* come into contact with the locking portion 111*g*. Thus, further inclination of the cams 130*g* is prevented to suppress further engagement. Accordingly, when torque higher than the predetermined torque is applied, slipping occurs between a cam receiving surface of the inner ring 110*g* and cam surfaces of the cams 130*g* or between a cam receiving surface of the outer ring 120*g* and cam surfaces of the cams 130*g*, and the torque is released.

Eighth Embodiment

Figure 21:
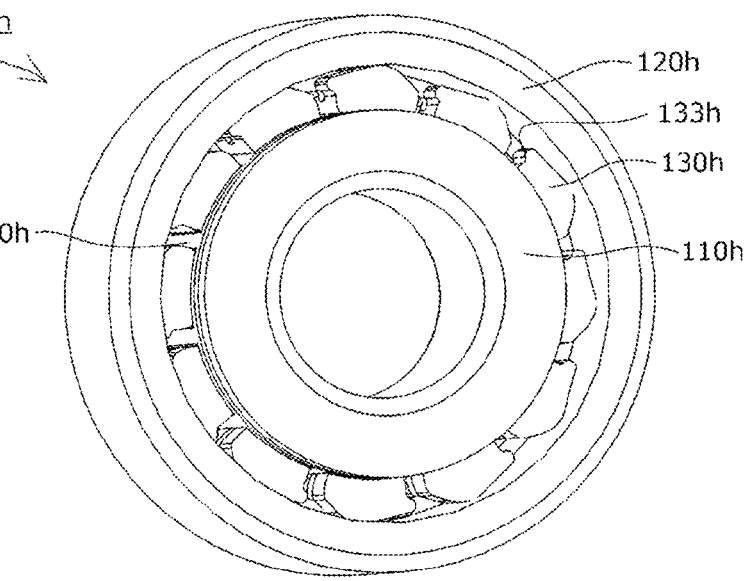
FIG. 21 is a perspective view of a cam clutch according to an eighth embodiment of the present invention.
Figure 22:
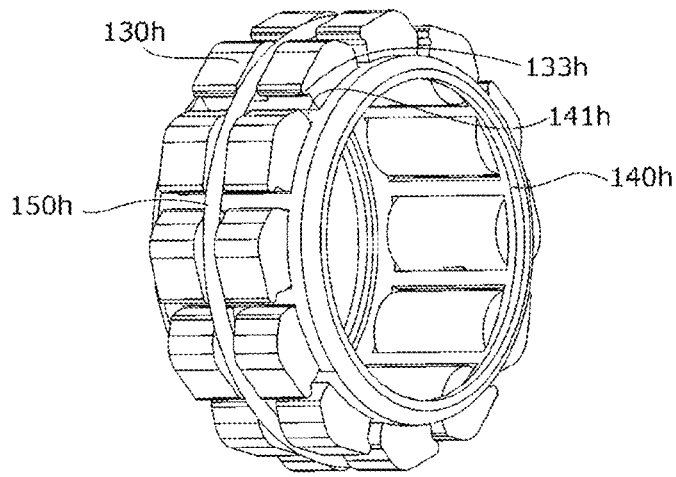
FIG. 22 is a perspective view of the cam clutch shown in FIG. 21 from which an outer ring and an inner ring are removed.
Figure 23:
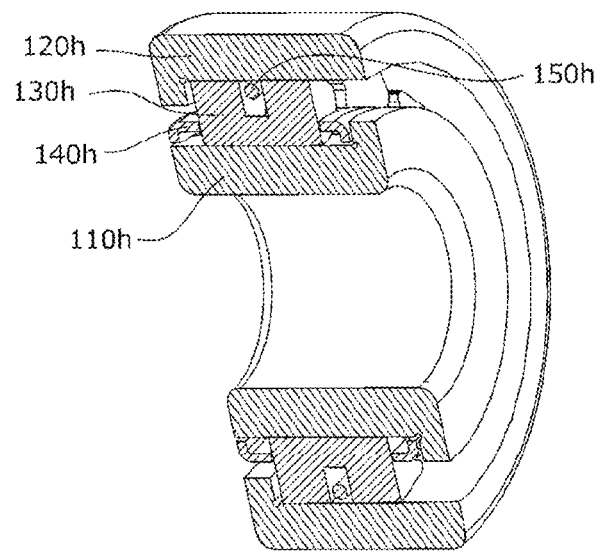
FIG. 23 is a partially cross-sectional perspective view of the cam clutch shown in FIG. 21.

As shown in FIGS. 21 to 23, a cam clutch 100*h* according to an eighth embodiment of the present invention includes an inner ring 110*h* and an outer ring 120*h* that are coaxial with each other and rotatable relative to each other, a plurality of cams 130*h* disposed in a circumferential direction between the inner ring 110*h* and the outer ring 120*h* to transmit torque, and biasing means (garter spring) 150*h* for biasing the plurality of cams 130*h* in a radial direction.

The plurality of cams 130*h* are supported and lined up in the circumferential direction by a cage member 140*h*.

Each cam 130*h* includes an inclination restricting portion 133*h* that restricts inclination in an engaging direction by coming into contact with a locking portion 141*h* of the cage member 140*h*.

In this cam clutch 100*h*, when the transmitted torque reaches a predetermined torque, the inclination restricting portions 133*h* of the cams 130*h* come into contact with the locking portions 141*h* of the cage member 140*h*. Thus, further inclination of the cams 130*h* is prevented to suppress further engagement. Accordingly, when torque higher than the predetermined torque is applied, slipping occurs between a cam receiving surface of the inner ring 110*h* and cam surfaces of the cams 130*h* or between a cam receiving surface of the outer ring 120*h* and cam surfaces of the cams 130*h*, and the torque is released.

Although embodiments of the present invention have been described in detail, the present invention is not limited to the above embodiments, and various design changes can be made without departing from the present invention defined by the claims.

For example, in each of the above embodiments, it is possible to adopt any of: a configuration in which the inner ring is fixed and the outer ring is rotated; a configuration in which the outer ring is fixed and the inner ring is rotated, and a configuration in which both the inner ring and the outer ring are rotated.

What is claimed is:

1. A cam clutch having a torque limiter function, comprising:
   at least one pair of an inner ring and an outer ring that are coaxial with each other and rotatable relative to each other;
   a plurality of cams disposed in a circumferential direction between the inner ring and the outer ring; and
   biasing means for biasing the plurality of cams so as to come into contact with the inner ring and the outer ring, wherein
   each of the cams includes an inclination restricting portion that restricts inclination of the cam in an engaging direction by coming into contact with a locking portion provided in a portion of the cam clutch other than cam receiving surfaces of the inner ring and the outer ring such that the contact of the inclination restricting portion with the locking portion limits the inclination of the cam to a position at which the cam transmits a predetermined torque between the inner ring and the outer ring to limit amount of transmitted torque between the inner ring and the outer ring.

2. The cam clutch having the torque limiter function according to claim 1, wherein
   the locking portion is provided in a cage member that supports and lines up the plurality of cams in the circumferential direction.

3. The cam clutch having the torque limiter function according to claim 2, wherein
   the locking portion is provided in a restriction member that is fitted to the outer ring or the inner ring from a side in an axial direction.

4. The cam clutch having the torque limiter function according to claim 1, wherein
   the inclination restricting portion is provided in one end portion or two end portions of the cam in an axial direction, and
   the locking portion is provided directly or indirectly to a portion of the outer ring or the inner ring other than the cam receiving surface of the outer ring or the inner ring.

5. A cam clutch having a torque limiter function, comprising:
   at least one pair of an inner ring and an outer ring that are coaxial with each other and rotatable relative to each other;
   a plurality of cams disposed in a circumferential direction between the inner ring and the outer ring; and
   biasing means for biasing the plurality of cams so as to come into contact with the inner ring and the outer ring, wherein
   each of the cams includes an inclination restricting portion that restricts inclination of the cam in an engaging direction by coming into contact with a locking portion provided in a portion of the cam clutch other than cam receiving surfaces of the inner ring and the outer ring,
   wherein the inclination restricting portion restricts the inclination of the cam in the engaging direction when a torque higher than a predetermined torque is applied during transmitting a torque equal to or lower than the predetermined torque between the inner ring and the outer ring through engagement of the cam between the inner ring and the outer ring to cause slipping between a cam surface of the cam and the cam receiving surface of the inner ring or the outer ring to limit amount of transmitted torque.

6. A cam clutch having a torque limiter function, comprising:
   at least one pair of an inner ring and an outer ring that are coaxial with each other and rotatable relative to each other;
   a plurality of cams disposed in a circumferential direction between the inner ring and the outer ring; and
   biasing means for biasing the plurality of cams so as to come into contact with the inner ring and the outer ring, wherein
   each of the cams includes an inclination restricting portion that restricts inclination of the cam in an engaging direction by coming into contact with a locking portion provided in a portion of the cam clutch other than cam receiving surfaces of the inner ring and the outer ring,
   wherein the locking portion is provided in a restriction member that is fitted to the outer ring or the inner ring from a side in an axial direction.

* * * * *